United States Patent [19]

Piestert et al.

[11] 4,299,942

[45] Nov. 10, 1981

[54] ADHESIVE COMPOSITION

[75] Inventors: Gerhard Piestert, Schriesheim; Heinz G. Gilch, Bad Homburg, both of Fed. Rep. of Germany

[73] Assignee: USM Corporation, Farmington, Conn.

[21] Appl. No.: 88,869

[22] Filed: Oct. 29, 1979

[30] Foreign Application Priority Data

Nov. 6, 1978 [GB] United Kingdom ............... 43384/78

[51] Int. Cl.³ ........................ C08F 20/08; C08F 20/20
[52] U.S. Cl. ................................ 526/323.1; 525/301; 525/303; 525/305; 525/404; 525/455; 526/271; 526/323.2
[58] Field of Search .................. 526/323.1, 323.2, 271; 525/301, 303, 305, 404, 455

[56] References Cited

U.S. PATENT DOCUMENTS

| | | | |
|---|---|---|---|
| 3,063,969 | 11/1962 | Stephens et al. | 526/271 |
| 3,591,438 | 7/1971 | Toback et al. | 526/323.2 |
| 3,970,505 | 7/1976 | Hauser et al. | 526/323.2 |
| 3,971,765 | 7/1976 | Green et al. | 526/323.2 |
| 4,148,988 | 4/1979 | Masuhara et al. | 526/271 |
| 4,180,640 | 12/1979 | Melody et al. | 526/323.2 |

*Primary Examiner*—Harry Wong, Jr.
*Attorney, Agent, or Firm*—John P. Morley

[57] ABSTRACT

Adhesive compositions comprising polyfunctional (meth)acrylate monomers, a source of free radicals, adhesion promotors which are poly(meth)acrylates having carboxylic acid groups pendant on pyromellitic acid dianhydride residues of the molecular chain and a compatible elastomer.

11 Claims, No Drawings

ADHESIVE COMPOSITION

THE FIELD OF THE INVENTION

This invention relates to adhesives. More precisely, the invention relates to anaerobic adhesive compositions curable from a fluid condition at room temperature.

DESCRIPTION OF THE PRIOR ART

Anaerobic adhesive compositions are known to the art. Such adhesive compositions comprise polymerizable, unsaturated monomers, for example dimethacrylate or diacrylate esters of polyglycols and the compositions can be stored for extended periods in the presence of oxygen, and can be polymerized quickly at room temperature in the absence of air. Other components such as inhibitors, e.g. hydroquinone, and a generator of free radicals, e.g. a peroxy compound are normally included in anaerobic adhesive compositions. By combining appropriate activators with the composition, adhesive bonds can be formed quickly between metal surfaces, and the adhesive compositions are particularly useful in screw locking and other metal bonding applications.

While bonds formed by anaerobic adhesives are satisfactory for many applications, the shear strength oftentimes obtained is too low for some bonding applications. Accordingly, these adhesives are not normally used in certain metal bonding applications. Another performance characteristic desired of known anaerobic adhesives involves improved resistance of the adhesive bond to the solvents, hot water, and exposure to repeated heating. A principle object of the present invention is to provide a curable adhesive for broader general application and capable of yielding adhesive bonds of acceptable tensile shear strength.

SUMMARY OF THE INVENTION

According to the present invention, the tensile shear strength of bonds formed with anaerobic adhesive compositions containing liquid polymerizable monomers can be significantly improved by including in the composition a combination comprising selected amounts of elastomer and certain adhesion promoters comprising polyacrylates or polymethacrylates having carboxylic acid groups pendant from their molecular chain.

DESCRIPTION OF THE PREFERRED EMBODIMENTS

The adhesion promoters included in the compositions of the present invention may be regarded as corresponding to a condensation product of reactants including acrylic acid or methacrylic acid or a derivative thereof and pyromellitic acid dianhydride or a derivative thereof. These materials are polyacrylate or polymethacrylates and have in their molecules two or more terminal acrylate or methacrylate groups so that they may become integrated into the polymer molecule during polymerization of the adhesive composition, and one or more carboxylic acid groups (pendant on pyromellitic dianhydride residues of the molecular chain) remaining free to improve adhesion to metal surfaces. The adhesion promoters may be produced from a variety of reactants. For example, they may be produced by the condensation of one mole of pyromellitic dianhydride with 2 moles of an acrylic material having hydroxyl, or epoxide groups, available for reaction with carboxyl groups. Suitable acrylic materials include for example butane diol monomethacrylate, 2 hydroxypropyl methacrylate, and glycidyl methacrylate.

Alternatively, the pyromellitic dianhydride, or the corresponding acid, may first be condensed with a polyfunctional linking material for example with a diamine, triamine or glycol and the resultant product condensed with acrylic or methacrylic acid. Suitable diamines and dialcohols include for example hexamethylene diamine, and mono-, di-, and tetra ethylene glycols. The identity of the linking material is not considered critical, but in adhesion promoters for preferred compositions a diol is the preferred linking material which is also used in forming the polymerizable ester monomer of the adhesive, e.g. tetraethylene glycol. A preferred adhesion promoter is a dimethacrylate corresponding to a condensation product from reaction of two moles of pyromellitic dianhydride with one mole of tetraethylene glycol in tetraethylene glycol dimethacrylate followed by reaction with 2 moles of butane diol monomethacrylate. In preparing such adhesion promoters, it is not necessary to separate the condensation product from the reactants in cases where those reactants are desirable or acceptable in the adhesive composition. Indeed, in some cases it is not necessary to prepare the adhesion promoter in advance of forming the adhesive composition. For example, if an adhesive composition is produced containing for example hydroxypropyl acrylate, pyromellitic dianhydride and a polyfunctional acrylate and the composition is heated to 70° C. for one hour, the adhesion promoter is formed in situ in sufficient quantities for many purposes.

In the preferred compositions, it is unnecessary to include more than about 1 to about 3 parts by weight adhesion promoter per 100 parts by weight polymerizable monomer in order to achieve surprisingly high bond strengths. In many cases, greater amounts of the adhesion promoter do not appear to induce any significant increase in bond strengths and indeed in some cases may yield somewhat lower bond strengths.

Elastomers suitable for use in the adhesive compositions of the invention are those which are compatible with the polymerizable monomer(s) and adhesion promoter and can be mixed with the monomer and promoter to provide an entirely homogeneous single liquid phase stable at temperatures between about 10° to about 30° C. Accordingly for the purposes of this invention a "compatible elastomer" means an elastomeric material which when thoroughly mixed into a mixture of the polymerizable monomer and up to 15% by weight of the monomer provides a solution which has a viscosity from 1000 to 30,000 millipascal seconds (mPa.s), and which does not separate into separate phases when stored for three months in a sealed glass bottle at 20° C. Examples of such materials include certain butadiene acrylonitrile elastomers, for example those supplied as Perbunan N3807NS a butadiene-acrylonitrile copolymer comprising about 39% acrylonitrile and having a Mooney viscosity (ML-4(100° C.)) of about 45, Hycar 1401H80 which is understood to be a butadiene-acrylonitrile copolymer with a high acrylonitrile content and having a Mooney viscosity (ML-4(100° C.)) of about 80, epichlorohydrin ethylene oxide elastomers for example Hydrin 100, Hydrin 200 which are understood to be polyether based elastomers having Mooney viscosities (ML-4(100° C.)) of about 70 and about 80 respectively, and certain hydroxyl terminated linear polyurethanes for example Desmocoll 406 which is understood to have a solution viscosity of about 5±3 poise (15% by weight in methyl ethyl ketone at 20° C.).

The elastomer contributes to flexibility and associated properties of bonds formed with the adhesive composition, for example resistance to peel and shear. However, the extent to which the elastomer may be used is determined by viscosity of the adhesive composition, which is increased with increased content of elastomer. Preferred adhesive compositions have a viscosity in the range 1000 to 15,000 mPa.s. In general, quantities of more than 15 parts by weight elastomer per hundred parts by weight polymerizable monomer tend to lead to adhesive compositions of undesirably high viscosity. With the preferred elastomers, and especially those having Mooney viscosities in the range about 35 to about 100, quantities of 10 to 12 parts by weight per hundred parts by weight polymerizable monomer provide a desirable blend of viscosity of the preferred adhesive composition together with high adhesion.

Liquid polymerizable monomers suitable for use in adhesive compositions of the invention comprise polyfunctional acrylates and methacrylates. In order to achieve high quality adhesives, the monomers include significant amounts of materials with two ethylenic unsaturated bonds in the end groups of their molecular chains. It is believed that these monomers not only have the capability of linear addition polymerization but also the capability of a certain degree of cross-linking between chains of polymer material. This cross-linking effect is believed to be significant with regard to the cohesive strength and solvent-resistance of the bonds formed. Monomers of the following general formula are preferred in the practice of the invention:

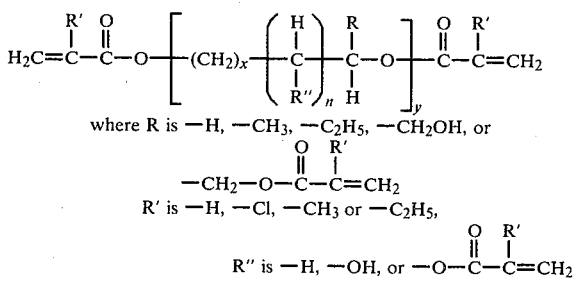

where R is —H, —CH$_3$, —C$_2$H$_5$, —CH$_2$OH, or $$-CH_2-O-\overset{O}{\underset{\|}{C}}-\overset{R'}{\underset{|}{C}}=CH_2$$

R' is —H, —Cl, —CH$_3$ or —C$_2$H$_5$,

R'' is —H, —OH, or $-O-\overset{O}{\underset{\|}{C}}-\overset{R'}{\underset{|}{C}}=CH_2$ and n is the number 0 or 1, x a whole number from 1 to 8, and y a whole number from 1 to 20. For screw fixing adhesives, ethylene glycol dimethacrylate may be used, as at least a large proportion of the acrylate monomers. Instead of or in addition to this monomer, others of the above general formula can be used according to the intended use and desired bond strength of the adhesive. Typical examples include tetraethyleneclycoldimethacrylate, triethyleneglycoldimethacrylate, diethyleneglycoldimethacrylate and esters of acrylic acid with tetraethyleneglycol, triethyleneglycol, diethyleneglycol and ethylene glycol, and diacrylate reaction products of di-epoxy resins (e.g. from Bisphenol A) and acrylic or methacrylic acid in a molar ratio of 2 moles of acrylic to one mole di-epoxy resin. Trifunctional materials may also be included in the liquid monomer component including for example, trimethylol propane trimethacrylate, which serves to increase cross-linking within the adhesive bond and to enhance properties associated with cross-linking. Additionally, mono acrylate esters may be included in the monomer component, for example 2-hydroxypropylmethacrylate, glycidylmethacrylate, hydroxyethylmethacrylate, decylmethacrylate, and acrylic acid, in order to modify such properties of the adhesive composition as odor, impact strength, or adhesion to glass.

The adhesive compositions of the present invention usually include a source of free radicals such as an organic peroxide (e.g. an organic hydroperoxide), a perester, or a peracid. Preferred free radical generators include cumene hydroperoxide, and 2,5-dimethyl-2,5-di-(t-butylperoxy)-hexane.

Activator compounds which may be used with adhesive compositions of the present invention to promote bond forming conditions may comprise for example a tertiary amine for example N,N-dimethylaniline, N,N-diethylaniline, N,N-dimethyl p-toluidine, N,N-diisopropyl(p-toluidine), o-benzoic sulphimide (saccharin) or condensation product of an aldehyde and a primary or secondary amine for example a condensation product of butyraldehyde with aniline or butylamine, or a condensation product of crotonaldehyde and aniline, examples of which include DuPont accelerators 808 and 833, and Vulcazit 576 from Bayer AG.

In the preferred practice of the invention the activator, i.e. a material effective to shorten the time required for curing of the adhesive composition is used in combination with a promoter. Promoters include organic compounds of transition metals for example cobalt, nickel, manganese or iron naphthenates, copper octoate, iron hexoate, or iron propionate, or complexes of acetyl acetone with iron, copper, cobalt or vanadium. Conveniently the activator and promoter may be provided as a solution in acetone for example.

Stabilizers which may be present in commercially available acrylate and methacrylate esters and which may also be included in the adhesive compositions to promote storage stability of the adhesives include quinones, hydroquinones, sterically hindered phenols and nitroxides. Preferred examples include hydroquinone and 2,6-di-t-butyl-4-methyl phenol.

Adhesive compositions according to the invention may be supplied in two parts. The first part comprises the liquid polymerizable monomer, a source of free radicals, stabilizer, adhesion promoter and compatible elastomer. The second part comprises the activator and promoter for combination with the source of free radicals to initiate polymerization of the monomers when the parts are mixed at room temperature.

In one particularly convenient method of using adhesives of this invention, the second part comprising the activator may be applied to the surfaces to be bonded in the manner of a primer prior to the application of the first part of the composition comprising the polymerizable monomers. This method allows the use of the adhesive composition without the necessity to mix the two parts prior to application.

The adhesives may be employed in a variety of applications for bonding various materials including steel, brass, copper, aluminium, glass, and filled plastics e.g. filled polyesters.

Manners of making and using the invention as well as advantages derived from practicing the invention will be more fully appreciated from the following Example presented to illustrate and not to limit the invention.

EXAMPLE I

In this Example, all of the Adhesive Compositions of Table I except Adhesive Compositions 1, 36, 37, 38 and 39 embody the practice of the present invention.

Each of the adhesion promoters described below corresponds to a condensation product of reactants including methacrylic acid or a derivative thereof and pyromellitic acid dianhydride or a derivative thereof. The condensation products are believed to be polymethacrylates having carboxylic acid groups pendant on pyromellitic acid residues of the molecular chain.

In the Adehsive Compositions of the invention, the selected adhesion promoters and compatible elastomers are each employed in quantities up to 15 parts by weight per hundred parts liquid polymerizable monomer.

Adhesive compositions of the invention were made up using "Master batch I" a masterbatch comprising a solution of Perbunan N 3807NS in tetraethylene glycol dimethacrylate. This solution was prepared by dissolving the elastomer in methylene chloride, adding the tetraethylene glycol dimethacrylate and then distilling off the methylene chloride at a temperature less than 60° C. The amount of elastomer used in Adhesive Compositions 1 to 29 was kept constant at 10% by weight of the tetraethylene glycol dimethacrylate. 2% by weight of 2,5-dimethyl-2,5-di-(t-butylperoxy)-hexane and 2% saccharin served as peroxide/activator system. Various amounts by weight of the monomer of different adhesion promoters were employed by weight of the tetraethylene glycol dimethacrylate (as indicated in Table I) to provide Adhesive Compositions 1 to 29.

Adhesive Compositions were made up using a Masterbatch 2 similar to Masterbatch 1 but omitting the 10% Perbunan N 3807NS. Instead of this quantity of elastomer, various amounts of Perbunan N3807NS, Hycar 1401H80, Hydrin 200 elastomers were employed in Adhesive Compositions 30 to 45, together with the adhesion promoter as shown in Table I.

The adhesion promoters used were materials corresponding to condensation products as follows:

Adhesion promoter 1

2 mole pyromellitic dianhydride and 1 mole tetraethylene glycol in tetraethylene glycol dimethacrylate were heated at 100° C. for 5 hours and then 2 mole butane diol monomethacrylate were added. The mixture was heated at 100° C. for 5 hours and then 2 mole butane diol monomethacrylate were added. The mixture was heated at 100° C. for 5 hours and allowed to cool.

Adhesion promoter 2

1 mole pyromellitic dianhydride was reacted with two moles of 2-hydroxypropyl methacrylate at 80° C. for five hours.

Adhesion promoter 3

1 mole pyromellitic acid was heated with two moles of glycidylmethacrylate in tetraethylene glycol dimethacrylate at 80° C. for 5 hours.

Adhesion promoter 4

1 mole Epikote acrylate resin DRH-303-1 (Deutsche Shell Chemie GmbH) was heated at 80° C. for five hours with 0.75 mole of monomethacryloxybutyl pyromellitic mono anhydride.

Adhesion promoters 5, 6 and 7

1 mole mono (adhesion promoter 5), di- (adhesion promoter 6) or tetra- (adhesion promoter 7) ethylene glycol was reacted with 2 mole pyromellitic dianhydride and then with 2 mole butane diol monomethacrylate.

Adhesion promoter 8

1 mole hexamethylene diamine was reacted with 2 mole pyromellitic dianhydride and then with 2 mole butane diol monomethacrylate.

The adhesive compositions of the invention were each flowable liquids of viscosity in the range 3000 to 15,000 mPa.s. The adhesive performance of the compositions was examined by tensile shear tests, described more fully below, which indicated that the various adhesives illustrative of the invention performed satisfactorily from the viewpoint of bond strength.

It was also observed that sample bonds prepared as described below demonstrated a somewhat lower but surprisingly high bond strength after immersion in boiling water for four weeks.

Tensile strengths of duplicate sample steel to steel bonds formed by use of Adhesive Compositions 1 to 45 were measured by a method according to ASTM D 1002-64. In this method steel coupons 100×25.4 mm were used, overlapping by 12.7 mm with the adhesive between the overlapping portions. The steel coupons were prepared by sand blasting, rinsing with acetone and drying in air at room temperature. The adhesive compositions were brushed onto the prepared surfaces to provide a thin film on one of the surfaces. The steel coupons were then pressed firmly together. The steel test specimen is subjected to a curing temperature of 150° C. for a period of one hour, and after cooling to 20° C. pulled apart on an Instron machine at a rate of 1 mm per minute. The forces required are recorded in Table II. While for test purposes the curing reaction is carried out under hot conditions, it will be apparent that in normal use of the appropriately formulated adhesive and activator, room temperature curing is achieved in a very short time. In some cases only as little as a few seconds curing may be necessary to achieve a finger-tight bond, with bond strength increasing rapidly over a period of an hour to one day.

The tensile shear test results with Adhesive Compositions 1 to 29 show that remarkably high adhesion is achieved with as little as 1% addition of the selected adhesion promoter, and that amounts above about 5% appear to be unnecessary.

The tensile shear results with Adhesive Compositions 30 to 39 show that presence of the elastomer leads to significant improvement in bond strength of the adhesive masterbatch especially where larger amounts are used.

TABLE I

| Adhesive Composition | Master batch | Elastomer | Amount % | Adhesion promoter | Amount % |
|---|---|---|---|---|---|
| 1 | 1 | Perbunan | 10 | 0 | 0 |
| 2 | 1 | " | 10 | 1 | 1 |
| 3 | 1 | " | 10 | 1 | 2 |
| 4 | 1 | " | 10 | 1 | 3 |
| 5 | 1 | " | 10 | 1 | 5.5 |
| 6 | 1 | " | 10 | 2 | 2.5 |
| 7 | 1 | " | 10 | 2 | 6 |
| 8 | 1 | " | 10 | 2 | 10 |
| 9 | 1 | " | 10 | 3 | 1 |

TABLE I-continued

| Adhesive Composition | Master batch | Elastomer | Amount % | Adhesion promoter | Amount % |
|---|---|---|---|---|---|
| 10 | 1 | " | 10 | 3 | 2 |
| 11 | 1 | " | 10 | 3 | 3 |
| 12 | 1 | " | 10 | 4 | 1 |
| 13 | 1 | " | 10 | 4 | 3 |
| 14 | 1 | " | 10 | 4 | 6 |
| 15 | 1 | " | 10 | 4 | 10 |
| 16 | 1 | " | 10 | 4 | 15 |
| 17 | 1 | " | 10 | 5 | 1 |
| 18 | 1 | " | 10 | 5 | 3 |
| 19 | 1 | " | 10 | 5 | 6 |
| 20 | 1 | " | 10 | 6 | 1 |
| 21 | 1 | " | 10 | 6 | 2 |
| 22 | 1 | " | 10 | 6 | 6 |
| 23 | 1 | " | 10 | 7 | 1 |
| 24 | 1 | " | 10 | 7 | 3 |
| 25 | 1 | " | 10 | 7 | 5 |
| 26 | 1 | " | 10 | 7 | 8 |
| 27 | 1 | " | 10 | 8 | 1 |
| 28 | 1 | " | 10 | 8 | 3 |
| 29 | 1 | " | 10 | 8 | 6 |
| 30 | 2 | " | 6 | 1 | 2 |
| 31 | 2 | " | 6 | 1 | 4 |
| 32 | 2 | " | 6 | 1 | 6 |
| 33 | 2 | " | 3 | 1 | 2 |
| 34 | 2 | " | 3 | 1 | 4 |
| 35 | 2 | " | 3 | 1 | 6 |
| 36 | 2 | " | 0 | 1 | 0 |
| 37 | 2 | " | 0 | 1 | 2 |
| 38 | 2 | " | 0 | 1 | 4 |
| 39 | 2 | " | 0 | 1 | 6 |
| 40 | 2 | Hycar | 10 | 1 | 1 |
| 41 | 2 | " | 10 | 1 | 3 |
| 42 | 2 | " | 10 | 1 | 5 |
| 43 | 2 | Hydrin | 12 | 1 | 1.5 |
| 44 | 2 | " | 12 | 1 | 3 |
| 45 | 2 | " | 12 | 1 | 5 |

TABLE II

| Adhesive Composition | Test Results - Tensile Shear Kp/cm$^2$ | Adhesive Composition | Kp/cm$^2$ |
|---|---|---|---|
| 1 | 160 | 13 | 270 |
|   | 165 |    | 280 |
| 2 | 290 | 14 | 235 |
|   | 320 |    | 245 |
| 3 | 280 | 15 | 240 |
|   | 300 |    | 245 |
| 4 | 280 | 16 | 225 |
|   | 300 |    | 240 |
| 5 | 295 | 17 | 170 |
|   | 315 |    | 200 |
| 6 | 308 | 18 | 200 |
|   | 312 |    | 220 |
| 7 | 305 | 19 | 170 |
|   | 310 |    | 200 |
| 8 | 308 | 20 | 250 |
|   | 312 |    | 260 |
| 9 | 245 | 21 | 220 |
|   | 260 |    | 245 |
| 10 | 310 | 22 | 250 |
|   | 315 |    | 260 |
| 11 | 320 | 23 | 280 |
|   | 330 |    | 300 |
| 12 | 225 | 24 | 270 |
|   | 320 |    | 290 |
| 25 | 280 | 37 | 120 |
|   | 295 |    | 135 |
| 26 | 280 | 38 | 135 |
|   | 280 |    | 145 |
| 27 | 300 | 39 | 145 |
|   | 310 |    | 150 |
| 28 | 295 | 40 | 180 |
|   | 310 |    | 220 |
| 29 | 275 | 41 | 235 |
|   | 300 |    | 245 |
| 30 | 235 | 42 | 245 |

TABLE II-continued

| Adhesive Composition | Test Results - Tensile Shear Kp/cm$^2$ | Adhesive Composition | Kp/cm$^2$ |
|---|---|---|---|
|   | 245 |   | 260 |
| 31 | 215 | 43 | 270 |
|   | 225 |    | 300 |
| 32 | 240 | 44 | 290 |
|   | 255 |    | 310 |
| 33 | 200 | 45 | 295 |
|   | 210 |    | 295 |
| 34 | 205 |    |    |
|   | 230 |    |    |
| 35 | 190 |    |    |
|   | 200 |    |    |
| 36 | 55  |    |    |
|   | 60  |    |    |

Having thus described our invention, what we claim as new and desire to secure by Letters Patent of the United States is:

1. An adhesive composition comprising liquid polymerizable polyfunctional acrylate or methacrylate monomer(s), a source of free radicals effective under bond forming conditions to initiate polymerization of the monomer(s), an adhesion promoter material corresponding to a condensation product of reactants comprising acrylic acid or methacrylic acid or a derivative thereof and pyromellitic acid dianhydride or a derivative thereof to provide a polyacrylate or polymethacrylate compound having carboxylic acid groups pendant on pyromellitic acid dianhydride residues of the molecular chain and said material being present in an amount up to about 15 parts by weight per hundred parts by weight of the polymerizable monomer(s), the composition also comprising up to about 15 parts by weight per hundred parts by weight of the polymerizable monomer(s) of a compatible elastomer.

2. A composition of claim 1 where the polymerizable manner comprises one or more esters of acrylic acid or methacrylic acid with tetraethylene glycol, triethylene glycol, diethylene glycol and ethylene glycol.

3. A composition of claim 1 where the polymerizable monomer is chosen from the group consisting of
   (a) a hydroxyl alkyl methacrylate,
   (b) trimethylolpropane trimethacrylate,
   (c) acrylic acid,
   (d) a diacrylate of 2 moles acrylic acid or methacrylic acid and one mole of a diepoxy resin derived from Bis phenol-A, and
   (e) glycidyl methacrylate or mixtures of these.

4. A composition of claim 3 where the polymerizable monomer comprises 2 hydroxypropyl methacrylate.

5. A composition of claim 1 where the adhesion promoter is present in an amount between about 1 to about 3% by weight per 100 parts by weight of the polymerizable monomer(s).

6. A composition of claim 1 where the compatible elastomer is present in an amount abetween about 10 to about 12 parts by weight per 100 parts by weight of the polymerizable monomer(s).

7. A composition of claim 1 where the elastomer has a Mooney viscosity in the range of about 35 to about 100 and comprises a butadiene acrylonitrile copolymer or an epichlorohydrin-ethylene oxide copolymer.

8. A composition of claim 1 where the source of free radicals comprises cumene hydroperoxide or 2,5-dimethyl-2,5-(t-butyl peroxy)hexane.

9. A two-part adhesive composition where the first part includes a composition of claim 1 and the second part includes an activator compound comprising a tertiary amine, o-benzoic sulphimide, or a condensation product of an aldehyde and a primary or secondary amine.

10. An adhesive composition comprising liquid polymerizable polyfunctional acrylate or methacrylate monomer(s), a source of free radicals effective under bond forming conditions to initiate polymerization of the monomer(s), an adhesion promoter material corresponding to a condensation product of one mole pyromellitic acid dianhydride with two moles of an acrylic material having hydroxyl or epoxide groups available for reaction with said pyromellitic acid dianhydride to provide a compound having carboxylic acid groups pendent on pyromellitic acid dianhydride residues of the molecular chain and said material being present in an amount up to about 15 parts by weight per hundred parts by weight of the polymerizable monomer(s), the composition also comprising up to about 15 parts by weight per hundred parts by weight of the polymerizable monomer(s) of a compatible elastomer.

11. An adhesive composition comprising liquid polymerizable polyfunctional acrylate or methacrylate monomer(s), a source of free radicals effective under bond forming conditions to initiate polymerization of the monomer(s), an adhesion promoter material corresponding to a condensation product of pyromellitic acid dianhydride with a polyfunctional diamine dialcohol followed by condensation with acrylic or methacrylic acid to provide a compound having carboxylic acid groups pendant on pyromellitic acid dianhydride residues of the molecular chain and said material being present in an amount up to about 15 parts by weight per hundred parts by weight of the polymerizable monomer(s), the composition also comprising up to about 15 parts by weight per hundred parts by weight of the polymerizable monomer(s) of a compatible elastomer.

* * * * *